United States Patent Office 3,182,008
Patented May 4, 1965

3,182,008
HYDROXYLATION OF ORGANIC COMPOUNDS
Donald L. Heywood, Charleston, Harry A. Stansbury, Jr., South Charleston, and Benjamin Phillips, Charleston, W. Va., assignors to Union Carbide Corporation, a corporation of New York
No Drawing. Filed June 14, 1961, Ser. No. 116,933
31 Claims. (Cl. 204—162)

The invention relates to a process for the hydroxylation of organic hydrocarbon compounds. In a particular aspect, the invention relates to a process for the hydroxylation of organic hydrocarbon compounds by inducing a free radical reaction between an organic peracid and an organic hydrocarbon compound.

Olefins are known to react with organic peracids by ways of an ionic reaction mechanism to produce a vicinal epoxide. Upon completion of the epoxidation reaction no further reaction between the reagents is observed, even when excess peracid is employed.

The present invention is based upon the discovery that a free radical reaction can be induced between organic peracids and certain organic hydrocarbon compounds. By employing the process of the invention, hydroxyl groups and other functional groups which are produced by first forming a hydroxyl-containing intermediate can be introduced into said organic hydrocarbon compounds. The inventive process has wide utility for preparing alcohols, ketones, esters, and other commercially useful compounds.

The process of the invention comprises reacting an organic peracid with an organic hydrocarbon compound free of olefinic carbon-to-carbon unsaturation and free of functional groups other than those described hereinbelow, at a temperature between about $-10°$ C. and $+500°$ C., for a period of time sufficient to hydroxylate said organic hydrocarbon compound, wherein the reaction between said organic peracid and said organic hydrocarbon compound is carried out under conditions which induce a free radical reaction between said organic peracid and said organic hydrocarbon compound.

It is believed that the process proceeds through the intermediate formation of hydroxyl radicals in the following manner (for simplicity, the reaction is formulated for peracetic acid and cyclohexane):

(a) $CH_3-CO-OOH \xrightarrow{\text{ultraviolet light}} CH_3CO_2\cdot + OH\cdot$ (b) $CH_3CO_2\cdot \longrightarrow CO_2 \uparrow + CH_3\cdot$ (c) 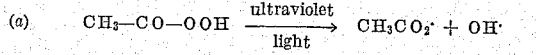

(d) 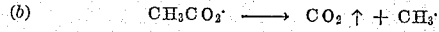

or (e) 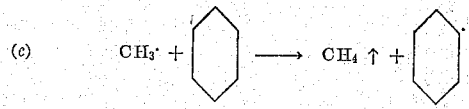

The reaction is carried out under the influence of ultraviolet light, heat, a catalyst comprising a metallic salt of an organic acid, an organic peroxide which readily undergoes free radical decomposition, or other means which can be employed to induce a free radical reaction.

The organic peracids which are employed in the inventive process are exemplified by compounds such as performic acid, peracetic acid, perpropionic acid, perbenzoic acid, and monoperphthalic acid. The higher aliphatic peracids such as perbutyric acid and pervaleric acid can be used; however, their use is not preferred for the reason that they could hydroxylate themselves. It is also preferred that the aromatic peracids not be employed when ultraviolet light is used to induce the free radical reaction because of the fact that aromatic compounds are known to absorb ultraviolet light. The preferred peracid is peracetic acid.

The organic hydrocarbon compounds which are employed in the process of the invention are the linear or branched chain aliphatic and cycloaliphatic hydrocarbons which have at least two carbon atoms, which are free of olefinic carbon-to-carbon unsaturation, and which can be unsubstituted or which can contain one or more of the following radicals: hydroxy, oxy, carboxyl, carboxy, amido, cyano, nitro, and halogen. In addition, the organic hydrocarbon compounds can be substituted with an aryl radical, such as a phenyl radical.

The reaction which occurs in the process of the invention can be employed to produce many different compounds. The following are exemplary:

A. Reaction between organic peracid and a saturated hydrocarbon produces an alcohol, as in the reaction between peracetic acid and cyclohexane.

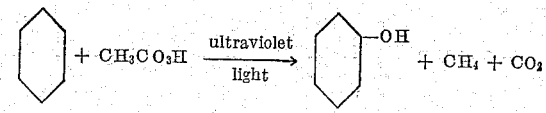

B. Reaction of organic peracid with a saturated primary alcohol yields a mixture of diols and esters, with a saturated secondary alcohol, a ketone is produced, and with a saturated tertiary alcohol, a diol is produced. The following reactions between peracetic acid and various alcohols are illustrative.

(1) Primary alcohol:

$CH_3-(CH_2)_3CH_2OH + CH_3CO_3H \xrightarrow{\text{ultraviolet light}}$ $CH_3-\overset{OH}{\underset{|}{C}}H(CH_2)_2CH_2OH$ and isomers $+ CH_4 + CO_2$ or

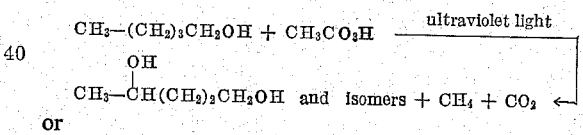

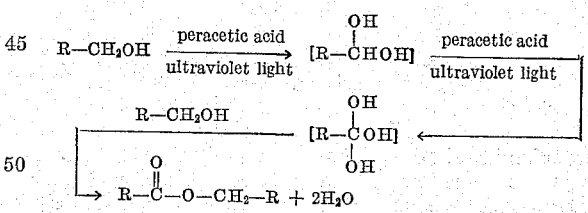

(2) Secondary alcohol:

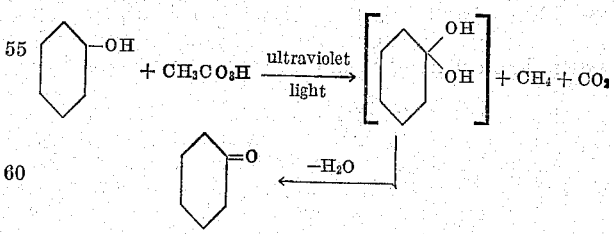

(3) Tertiary alcohol:

$(CH_3)_3COH + CH_3CO_3H \xrightarrow{\text{ultraviolet light}}$ $HOCH_2-\overset{CH_3}{\underset{\underset{CH_3}{|}}{\overset{|}{C}}}-OH + CH_4 + CO_2$ C. Reaction of organic peracid with lactones yields hydroxylactones or isomers thereof. The reaction between peracetic acid and gamma-valerolactone is llustrative:

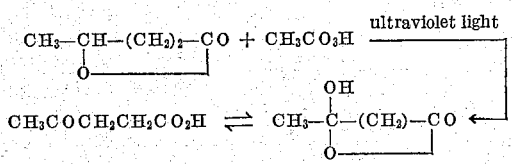

D. Reaction of organic peracid with carboxylic acids yields hydroxycarboxylic acids. Reaction of peracetic acid with valeric acid is illustrative:

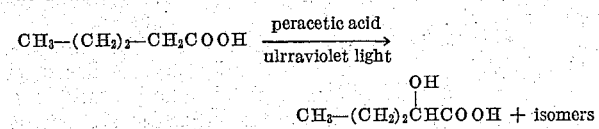

E. Reaction of organic peracid with esters yields hydroxyesters. The reaction of ethylcyclohexanecarboxylate with peracetic acid is illustrative:

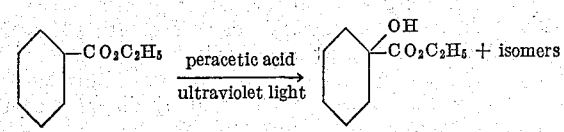

F. Reaction of an aliphatic ether with an organic peracid yields an aliphatic alcohol plus an aliphatic carboxylic acid. The following reactions is illustrative:

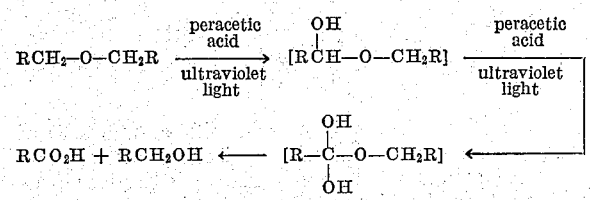

In addition, the reaction of an organic peracid with an aliphatic nitrile yields a hydroxynitrile, with an aliphatic nitro compound a hydroxynitro compound is produced, and with a halogen-substituted aliphatic compound, a hydroxyhalo compound is produced.

From the foregoing discussion it is seen that the number of organic hydrocarbon compounds which can be employed in the invention is very large. For example, the saturated aliphatic hydrocarbons can be employed, which includes linear and branched chain and cycloaliphatic hydrocarbons. Among the linear and branched chain hydrocarbons which can be employed are ethane, propane, butane, the pentanes, the hexanes, the heptanes, the octanes, the nonanes, the decanes, the dodecanes, the pentadecanes, the octadecanes, the eicosanes, and the like, through mineral oil, paraffin wax, polyethylene, and polypropylene. The lower members of the series, i.e., ethane and propane, are somewhat difficult to hydroxylate by the process of the invention. The reason for this is that they are gases, or at least highly volatile liquids, at reaction temperature, and would require a pressurized system in order to maintain the hydrocarbon in the reaction mixture.

Among the saturated cycloaliphatic hydrocarbons which can be employed in the invention are found cyclopentane, cyclohexane, cycloheptane, cyclooctane, decahydronaphthalene (decalin), tetrahydrodicyclopentadiene, alkyl-substituted cycloaliphatic hydrocarbons such as methylcyclopentane, ethylcyclohexane, the menthanes, pinane, bicyclo[2.2.1]heptane, and the like.

Saturated aliphatic alcohols, including linear, branched chain, and cycloaliphatic alcohols, can be employed in the process of the invention. These include ethanol, propanol, isopropanol, n-butanol, tertiary butanol, the pentanols, the hexanols, 2-ethylhexanol-1 and other octanols, n-decanol and other decanols, the dodecanols, the pentadecanols, stearyl alcohol and other octadecanols, the eicosanols, myricyl alcohol, ceryl alcohol, cyclohexanol, cyclopentanol, cycloheptanol, the alkyl-substituted cyclohexanols, and the like.

Saturated aliphatic carboylic acids, including the linear, branched chain, and cycloaliphatic carboxylic acids, can be employed in the process of the invention. Illustrative of such carboxylic acids are butyric acid, isobutyric acid, pentanoic acid, hexanoic acid, heptanoic acid, octanoic acid, nonanoic acid, decanoic acid, lauric acid, myristic acid, palmitic acid, stearic acid, 2-ethylcaproic acid, adipic acid, cyclohexanecarboxylic acid, hexahydrophthalic acid, hexahydrophthalic acid anhydride and the like. Acetic acid and propionic acid can also be employed, but the reaction rate is very slow. It is seen, therefore, that virtually any aliphatic or cycloaliphatic carboxylic acid that has at least two carbon atoms can be employed in the invention with good results.

Saturated aliphatic hydroxyl acids and their internal esters (lactones) can be employed in the invention. Examples include gamma-valerolactone, gamma-hydroxyvaleric acid, epsilon-caprolactone, epsilon-hydroxycaproic acid, gamma-butyrolactone, zeta-enantholactone, epsilon-caprylacetone, and the like.

Saturated aliphatic esters, including linear, branched chain, and cycloaliphatic esters, can be employed. Illustrative are butyl acetate, pentyl acetate, hexyl acetate, heptyl formate, octyl acetate, nonyl propionate, decyl acetate, dodecyl octoate, 2-ethylhexyl acetate, glyceryl trialkyl esters, octyl cyclohexanecarboxylate, ethyl cyclohexancarboxylate, the naturally-occurring waxes such as beeswax and carnauba wax, and the like. The low molecular weight esters such as methyl formate, ethyl acetate, propyl propionate, propyl formate, and the like, can be employed, but they react only very slowly in the process of the invention. In fact, ethyl acetate is employed as a solvent for the organic peracid without significantly interfering in the reaction.

Saturated aliphatic ethers, including linear, branched chain and cycloaliphatic ethers, can be hydroxylated by the process of the invention. Exemplary ethers which can be employed include dipropyl ether, dibutyl ether, dipentyl ether, dihexyl ether, diheptyl ether, dioctyl ether, dinonyl ether, didecyl ether, dilauryl ether, distearyl ether, dicyclopentyl ether, dicyclohexyl ether, 2-ethylhexyl cyclohexyl ether, dioxane, tetrahydrofuran, and the like.

Many other organic hydrocarbon compounds containing various functional groups can be employed in the process of the invention. Illustrative are the saturated aliphatic nitriles such as propionitrile, butyronitrile, valeronitrile, capronitrile, enanthonitrile, caprynitrile, cyclohexanecarbonitrile, and the like; saturated aliphatic amides such as propionamide, butyramide, valeramide, caproamide, caprylamide, capramide, stearamide, adipamide, cyclohexanecarboxamide, hexahydrophthalamide, and the like; saturated nitroaliphatic and nitrocycloaliphatic compounds such as nitrobutane, nitrohexane, nitrooctane, nitrocyclohexane, and the like; halogen-substituted aliphatic and cycloaliphatic compounds such as 1-chlorobutane, chlorocyclohexane, bromocyclopentane, 1-iodohexane, the chlorooctanes, the chlorodecanes, and the like. Aryl-substituted alkanes can also be employed, for example, toluene, ethylbenzene, propylbenzene, t-butylbenzene, and the like. In addition to polyethylene and polypropylene, other polymers which can be employed include poly(methyl methacrylate), poly(vinyl acetate), poly(1-hexene), polystyrene, poly(vinyl chloride), polyacrylonitrile, and the like.

From an inspection of the above-exemplified compounds, it is seen that many different kinds of organic hydrocarbon compounds are operative in the process of the invention. The important characteristics of the organic hydrocarbon compounds employed are that they contain no olefinic carbon-to-carbon unsaturation and no functional groups which are readily-oxidizable or which readily react with the organic peracid. In addition to olefinic carbon-to-carbon unsaturation, the functional groups to be avoided include thio, amino, aldehyde, and ketone.

The process of the invention is carried out under conditions which induce a free radical reaction between the organic peracid and the organic hydrocarbon compound. These conditions include the use of ultraviolet light, heat, metal salts of organic acids as catalysts, other peroxides, or combinations thereof. The preferred method for inducing the free radical reaction is by irradiation of the reaction mixture with ultraviolet light, that is, light having a wave length between about 2300 and about 3200 Angstrom units. The irradiation can be effected by using a mercury arc or an equivalent source of ultraviolet light according to methods which are known in the art. Ultraviolet light as a method for inducing the free radical reaction is particularly useful at temperatures between about −10° C. and +100° C., although it can be employed, if desired, throughout the entire range of temperatures at which the process of the invention can be carried out (i.e., up to about 500° C.). The preferred temperature range when employing ultraviolet light as the means for inducing the free radical reaction is between about +10° C. and +60° C.

Elevated temperatures can be employed to induce the free radical reaction. At temperatures between about 80° C. and 500° C., and preferably between about 120° C. and 350° C., the free radical reaction proceeds under the influence of the heat alone.

The free radical reaction can be catalytically induced by including in the reaction mixture a catalytic amount of a metallic salt of an organic acid. The metallic salts contemplated are those which are known in the art as "metallic driers," such as cobalt naphthenate, and the like. The catalyst is employed in catalytic amounts, generally from about 0.01 percent to about 1 percent, based on weight of organic peracid. These catalysts can be employed at reaction temperatures of from about 20° C. to about 120° C., and preferably from about 30° C. to about 80° C.

The free radical reaction can also be induced by including in the reaction mixture a minor amount of an organic peroxide which readily undergoes free radical decomposition. Examples of such organic peroxides include the dialkyl peroxides such as ditertiarybutyl peroxide, the alkyl hydrogen peroxides such as tertiary-butyl hydroperoxide, the symmetrical acyl peroxides such as dibenzoyl peroxide and diacetyl peroxide, the ketone peroxides such as methyl ethyl ketone peroxide, and the like. The peroxide is normally employed in amounts varying from about 0.1 percent to about 3 percent, based on weight of organic peracid. The reaction temperature will depend in part upon the decomposition temperature of the particular organic peroxide employed. A suitable temperature will normally be found between about 20° C. and about 150° C., and preferably from about 30° C. to about 100° C.

The process of the invention is continued for a period of time sufficient to hydroxylate the organic hydrocarbon compound employed. The exact reaction time used depends, in part, upon a variety of factors such as reaction temperature, nature of reactants, the particular method employed to induce the free radical reaction, whether the reaction is run as a batch, semicontinuous, or as a continuous process, and the like. For example, with a continuous process the reagents can be reacted for from about 0.5 second up to about 60 seconds, or longer, and preferably for from about 1 to about 5 seconds. With a batch process, a suitable reaction time will normally be found in the range of from about 30 minutes up to about 75 hours. The preferred reaction time is from about 2 to about 50 hours, and most preferably from about 5 to about 35 hours.

The ratio of the reactants can be varied widely, however, it is generally preferred to employ a molar excess of organic hydrocarbon compound over organic peracid, except when hydroxylating high molecular weight compositions such as paraffin, polyethylene, polypropylene, and the like, in which case molar ratios are not appropriate. One of the reasons for employing a molar excess of organic hydrocarbon compound is to avoid producing too many reaction products and thereby make it more difficult to separate the products. To illustrate, consider the many possible reaction products of, for example, decane. These include n-decyl alcohol, secondary decyl alcohols, decanones, decyl decanoate, decanediols, and so forth. However, if a molar excess of decane is employed, most of the product will be decyl alcohols, with very little additional hydroxylation of the alcohols to diols, ketones, esters, etc.

The organic peracid can be employed in the process of the invention in amounts varying from about 0.05 mole to about 1.25 moles per mole of organic hydrocarbon compound, and preferably from about 0.1 mole to about 0.7 mole per mole of organic hydrocarbon compound. The ratio of the reactants can also be expressed in terms of weight (particularly when hydroxylating a polymer) and can vary from about 2 parts by weight to about 5000 parts by weight of organic peracid per 100 parts by weight of organic hydrocarbon compound. The preferred weight ratio is from about 10 to about 4000 parts by weight of organic peracid per 100 parts by weight of organic hydrocarbon compound.

It is preferable to carry out the process of the invention at about atmospheric pressure, although reduced or elevated pressures can be employed if desired.

The process of the invention can be carried out with the reagents dissolved in an organic solvent, as well as with the reagents in the undiluted state. The solvent employed does not have to be completely inert toward the organic peracid as long as it does not significantly interfere with the reaction between the organic peracid and the organic hydrocarbon compound. Low molecular weight aliphatic esters such as etheyl acetate have proven to be satisfactory solvents for the reaction, since their reactivity in the process of the invention is relatively low. Similarly, methylene chloride or carbon tetrachloride can be used as solvents. Aromatic compounds such as benzene can be employed as solvents, but are not desirable when ultraviolet light irradiation is employed to induce the free radical reaction because of the tendency of aromatic systems to absorb ultraviolet light, with resultant retarding effect on the reaction. Total concentration of the reagents in the solvent is not critical, and can vary from 100 percent (no solvent) down to about 20 percent, based on solution weight. More dilute solutions can be employed if desired, but low reaction rates will probably result.

A particularly desirable method for carrying out the process of the invention is to slowly add a solution of peracetic acid in ethyl acetate (concentration of acid in the ethyl acetate solution can vary widely, for example from about 15 to about 40 weight percent, based on solution weight) to a molar excess of undiluted organic hydrocarbon compound while irradiating the reaction mixture with ultraviolet light. The addition is followed by a subsequent irradiation period for the balance of the reaction period. The products of the reaction are then separated from solvent and unreacted starting material by standard methods such as fractional distillation, extraction with suitable solvents, and the like.

The process of the invention can be carried out in standard equipment such as a reaction kettle equipped with agitator and means for heating and cooling. Standard materials of construction can be used, for example, glass, stainless steel, and the like. When ultraviolet light is employed to initiate the free radical reaction, provision must be made for allowing a means of entry of the incident light into the reactor, such as through a Vycor or quartz window or well, or the like.

An important aspect of the invention is that the process can be employed to hydroxylate high molecular weight materials such as mineral oil, the naturally occurring waxes such as beeswax, paraffin wax, high polymers such as polyethylene and polypropylene, and the like. Where these high molecular weight materials can be dissolved in a solvent which is also a solvent for the organic peracid, the hydroxylation techique is essentially the same as that employed for hydroxylating the lower molecular weight monomeric compounds discussed hereinabove. Frequently, however, a high polymer such as polyethylene is not readily soluble in any solvent, so the hydroxylation must then be carried out as a two-phase reaction. One technique has been employed successfully is to disperse finely-divided polyethylene in a liquid such as ethyl acetate, and to mix this dispersion with peracetic acid and then irradiate the mixture with ultraviolet light. If desired, a compound such as cyclohexane can be added to the reaction mixture to act both as a solubilizing agent for the polyethylene and also as a means for facilitating the free radical reaction. Another technique which can be employed is to pass a continuous film of polyethylene or polypropylene through an irradiated solution of peracetic acid. The film so treated displays enhanced printability and affinity for coatings, which is a useful property in many applications.

In the examples which follow, where the free radical reaction was induced by irradiation with ultraviolet light, the source of the ultraviolet light was a 200-watt Hanovia high pressure quartz mercury arc in a water-cooled Vycor well which was inserted in the center neck of the reaction flask employed to carry out the experiment.

*Example 1*

To 2340 grams (28.2 moles) of cyclohexane, 1023 grams of peracetic acid solution in ethyl acetate containing 240 grams (3.16 moles) of peracetic acid were added dropwise over a period of 13 hours. During the addition, the reaction mixture was irradiated with ultraviolet light and the reaction mixture was maintained at 22–25° C. Vigorous evolution of gas occurred during the addition. A sample of the gas was analyzed and was found to contain 5.7 mole percent cyclohexane, 52.2 mole percent carbon dioxide, and 42.1 mole percent methane. A trace of peracetic acid remained after the addition was completed, so the reaction mixture was irradiated for an additional period of two hours at 22–25° C. until gas evolution stopped.

The reaction mixture was treated with 1485 grams of 20 percent aqueous potassium hydroxide, with cooling and vigorous agitation. The organic layer was separated from the aqueous layer. The aqueous layer was extracted with diethyl ether, and the combined ether extract and organic layer was dried over anhydrous sodium sulfate. After removal of the ether by distillation, the organic layer was fractionated to give 138 grams of product having a boiling point of 150–160° C. and a refractive index $n$ 30/D of 1.4434–1.4594. Of this product, 120 grams boiled at 156–160° C. and had a refractive index $n$ 30/D of 1.4593, and consisted of 6.3 percent cyclohexanone and 90.2 percent cyclohexanol. The cyclohexanone content was determined by titration with hydroxylamine hydrochloride and the cyclohexanol by titration with phthalic anhydride.

The 2,4-dinitrophenylhydrazone derivative prepared from this fraction had a melting point and a mixed melting point with the 2,4-dinitrophenylhydrazone derivative of reagent grade cyclohexanone of 56–158° C. The 3,5-dinitrobenzoate prepared from this fraction had a melting point and a mixed melting point with the 3,5-dinitrobenzoate of reagent grade cyclohexanol of 111–112° C.

*Example 2*

A solution of peracetic acid in ethyl acetate (240 grams of acid in 904 grams of solution) was fed dropwise with stirring to 1978 grams of a mixture of hexane and isohexanes having a boiling point of 64–67° C. over a period of 8.33 hours. During the addition, the reaction mixture was irradiated with ultraviolet light and the reaction temperature was maintained at 25–28° C. After an additional irradiation period of 8.67 hours at 25–40° C., analysis for peracetic acid showed a 95 percent conversion of the acid. A sample of the gas evolved during the reaction was analyzed by mass spectrometer and found to contain 40.3 mole percent methane, 32.9 mole percent carbon dioxide, plus small amounts of acetic acid, oxygen, and carbon monoxide.

A portion of the reaction solution weighing 1659 grams was steam distilled, and the organic portion of the steam distillate was separated and dried over sodium sulfate. Fractionation of this product yielded 111 grams of mixed hexanols and methylpentanols. The product mixture had a boiling point of 120–144° C. and a refractive index $n$ 30/D of 1.4100–1.4151. The identity of the product was further confirmed by infrared analysis which revealed the presence of a small amount of carbonyl-containing impurities.

*Example 3*

In this experiment, para-menthane was hydroxylated to para-menthol. The para-menthane employed had a boiling point of 169–171° C. and a refractive index $n$ 30/D of 1.4367.

A solution of peracetic acid in ethyl acetate (237 grams, 3.12 moles, of acid in 1000 grams of solution) was added dropwise over a period of 9 hours to 823 grams (5.88 moles) of para-menthane. During the addition, the reaction mixture was irradiated with ultraviolet light and was maintained at 25–50° C. The irradiation was continued at this temperature for an additional 10 hours, after which analysis indicated that 94 percent of the peracetic acid had been consumed. Fractionation of the reaction mixture yielded a mixture of menthol isomers which weighed 263 grams, boiled from 88–165° C. at 15 millimeters of mercury, and had a refractive index $n$ 30/D of 1.4557–1.4674. Analysis of the largest single fraction (110 grams, boiling point 94–98° C. at 15 millimeters of mercury, refractive index $n$ 30/D of 1.4572) gave the following. Found: C—76.4 percent; H—12.7 percent, 166 molecular weight. Calculated for $C_{10}H_{20}O$: C—76.86 percent, H—12.9 percent, molecular weight 156.

*Example 4*

A solution of peracetic acid in ethyl acetate (380 grams, 5.0 moles of acid in 1502 grams of solution) was added over a period of 7 hours to isooctane (1717 grams, 15.05 moles). During the addition period and a subsequent period of 15 hours, the reaction mixture was irradiated with ultraviolet light and was maintained at 25–50° C. Peracetic acid analysis at this point indicated a conversion of 92 percent. A portion of the reaction mixture weighing 2236 grams was steam distilled. The organic layer of the steam distillate was separated and dried over anhydorus sodium sulfate. Fractionation of the organic layer yielded 88 grams of isooctyl alcohols boiling at 130–180° C. A mid-fraction weighing 42 grams had a boiling point of 146–151° C. and a refractive index $n$ 30/D of 1.4214.

*Example 5*

To 2689 grams (19.45 moles) of decalin, there was added an ethyl acetate solution of peracetic acid (370 grams, 4.865 moles in 1445 grams of solution) over a period of 14 hours. During the addition and a subsequent period of 10 hours, the reaction mixture was irradiated and was maintained at 25–35° C. Fractionation of the reaction mixture gave a series of fractions containing isomeric decalols, of which the major portion (216 grams) was the trans-9-decalol isomer having a boiling point at 20 millimeters of mercury of 100–110° C. and a melting point of 52–54° C.

*Example 6*

In this experiment, tetrahydrodicyclopentadiene was hydroxylated. The starting material was prepared by hydrogenation of endo-dicyclopentadiene, and had a boiling point of 186–191° C.

Tetrahydrodicyclopentadiene (135 grams, 1.0 mole) was charged to a flask and heated to 185° C. An ethyl acetate solution of peracetic acid (76 grams, 1.0 mole of acid in 291 grams of solution) was added dropwise to the reaction mixture as the ethyl acetate was continuously removed from the head of a column fitted on the flask. The addition took 6 hours, during which time the temperature of the reaction mixture fell to 140° C. The reaction mixture was then cooled to room temperature, dissolved in diethyl ether, and washed with 5 percent aqueous sodium hydroxide. The organic layer was separated and fractionated to yield 52 grams of hydroxytetrahydrodicyclopentadiene which boiled at 85–140° C. at 35–20 millimeters of mercury absolute pressure. Recrystallization from ligroin of a mid-fraction (boiling point 125–130° C. at 20 millimeters of mercury) weighing 38 grams gave a pure hydroxytetrahydrodicyclopentadiene having a melting point of 131–132° C. This was probably the 2-isomer and had the following elemental analysis. Found: 78.81 percent carbon, 10.66 percent hydrogen. Calculated for $C_{10}H_{16}O$: 78.89 percent carbon, 10.59 percent hydrogen.

*Example 7*

In this experiment, pinane was hydroxylated. The starting material was prepared by hydrogenation of alpha-pinene, and had a boiling point of 166–170° C. and a refractive index $n\ 30/D$ of 1.4580.

Pinane (640 grams, 4.64 moles) was treated dropwise with an ethyl acetate solution of peracetic acid (722 grams of solution containing 110.2 grams, 1.45 moles, of acid) over a period of 2.16 hours. During the addition, the reaction mixture was irradiated with ultraviolet light, and was maintained at 30–35° C. An additional irradiation period was continued for 14.33 hours during which time the reaction mixture was maintained at 40–45° C. No unreacted peracetic acid remained in solution at the end of this period.

Fractionation of the reaction mixture yielded 92 grams of hydroxylated pinanes boiling at 66° C. at 20 millimeters of mercury absolute pressure to 124° C. at 5 millimeters of mercury, and a refractive index $n\ 30/D$ of 1.4606–1.4760.

*Example 8*

Paraffin wax (144 grams, Esso Standard Oil Co. of N.J.) was dissolved in n-heptane and treated with 554 grams of a 25.5 percent solution of peracetic acid in ethyl acetate. The reaction mixture was irradiated with ultraviolet light for 33.3 hours at 35–45° C., after which time 92 percent of the peracetic acid had been consumed. The solution was concentrated by removal of volatile solvent and products, to yield 135 grams of oxidized paraffin wax. The presence of hydroxyl and carbonyl groups in the wax was indicated by infrared bands at 3.0 and 5.86 microns.

*Example 9*

Ten grams of polyethylene resin were dissolved in heptane and treated with 1500 grams of a 25.7 percent solution of peracetic acid in ethyl acetate. The reaction mixture was irradiated for 36 hours while the temperature was maintained at 40° C. The solution was cooled and concentrated, and the oxidized polyethylene was removed by filtration. Infrared analysis of the polyethylene indicated the presence of hydroxyl and carbonyl groups. Elemental analysis of the polyethylene found 82.0 percent C, 13.8 percent H, thus indicating 4.2 percent oxygen.

*Example 10*

Peracetic acid (8.0 moles) was fed dropwise during 8 hours to cyclohexanol (20.0 moles). During the addition, the reaction mixture was irradiated with ultraviolet light and was maintained at 20–25° C. During the feed period and additional irradiation period of 7 hours, a vigorous evolution of gas (largely methane and carbon dioxide) was observed. Direct fractionation of the reaction mixture yielded three main fractions: (1) recovered cyclohexanol (11.0 moles); (2) cyclohexyl epsilonhydroxycaproate (0.72 mole); and (3) a non-distillable residue which was identified as a polyester of adipic acid and epsilonhydroxycaproic acid, terminated with cyclohexyl groups.

Identification of fraction (2) was based on elemental analysis, molecular weight, and saponification to cyclohexanol and epsilon-hydroxycaproic acid. The melting point of the 3,5-dinitrobenzoate derivative of the cyclohexanol and the mixed melting point with the 3,5-dinitrobenzoate of reagent grade cyclohexanol were both 109.5–110.5° C. The hydrazide melting point and mixed melting point of the epsilon-hydroxy-caproic acid were both 113–115° C.

Identification of fraction (3) was based on saponification to yield cyclohexanol, adipic acid, and epsilon-hydroxycaproic acid. The cyclohexyl 3,5-dinitrobenzoate melting point and mixed melting point was 110–111° C.; the adipic acid melting point and mixed melting point was 147–152° C. and the epsilon-hydroxycaproic hydrazide melting point and mixed melting point was 112–113.5° C. In fraction (3), there was mole of adipic acid for every 6 moles of epsilon-hydroxycaproic acid.

*Example 11*

Decyl alcohol (995 grams, 6.3 moles) was treated with 160 grams of peracetic acid (2.1 moles) by adding the acid as a 27.5 percent solution in ethyl acetate over a period of 3 hours. During the addition, the reaction mixture was irradiated with ultraviolet light and was maintained at 35–40° C. The irradiation was continued at these temperatures for an additional 10 hours. The products were recovered by fractionation and were found to be 107 grams of mixed $C_{10}$ keto-alcohols (the mid-cut of which exhibited a boiling point 146–150° C. at 5 millimeters of mercury, refractive index $n\ 30/D$ of 1.4449), and 54 grams of the decyl ester of decanoic acid as a residue. The identification of the ester was confirmed by saponification equivalent (calculated, 312; found, 323), infrared spectrum, and saponification to decanoic acid (melting point and mixed melting point of the amide, 95° C.) and decyl alcohol (melting point and mixed melting point of the 3,5-dinitrobenzoate, 53–55° C.).

*Example 12*

Stearyl alcohol (583 grams) was dissolved in 956 grams of ethyl acetate. To this mixture was added 214 grams of a 25.7 percent solution of peracetic acid in ethyl acetate over a ½-hour period. During this period and a subsequent period of 7 hours, the reaction mixture was irradiated with ultraviolet light and was maintained at 40–43° C. The resultant product mixture was concentrated at a temperature of 100° C. and 4 millimeters of mercury. The residue was a waxy solid which showed infrared absorption bands characteristic of carboxylic acid ester and ketone or aldehyde.

*Example 13*

To 2000 grams (20.0 moles) of gamma-valerolactone was added dropwise 1082 grams of an ethyl acetate solution of peracetic acid (304 grams, 4.0 moles of acid). The reaction mixture was irradiated with ultraviolet light during the addition, which took 3.5 hours, during which the reaction mixture was maintained at 25–30° C. The reaction mixture was irradiated for an additional 8 hours at the same temperature, after which time analysis indicated that 41.7 percent of the peracetic acid had been consumed. An additional charge of 1000 grams (10 moles) of gamma-valerolactone was added to the reaction mixture and irradiation was continued for 10.5 hours at 50–60° C. Analysis then indicated that 90.2 percent of the peracetic acid had been consumed.

A portion of the reaction mixture was concentrated and fractionated to give the product, levulinic acid, in 41 percent yield. The product was identified by boiling point, 133–137° C. at 10 millimeters of mercury; refractive index $n$ 30/D of 1.4460; titration for acid equivalent calculated: 116, found: 110; and preparation of semicarbazone-melting point and mixed melting point with semicarbazone of reagent grade levulinic acid was 190–191.5° C.

*Example 14*

In this experiment, cyclohexanecarboxylic acid was hydroxylated. The starting material had a boiling point of 130–133° C. at 20 millimeters of mercury pressure and an acid equivalent of 128.

Cyclohexanecarboxylic acid (384 grams, 3.0 moles) was dissolved in 403 grams of an ethyl acetate solution of peracetic acid (114 grams, 1.5 moles of peracetic acid). The solution was irradiated with ultraviolet light at a temperature of 31–60° C. for 21 hours, after which time 95.7 percent of the peracetic acid had been consumed. The solution was stripped free of volatile materials and a portion of the residue fractionated at reduced pressure to give crude hydroxycyclohexanecarboxylic acids, boiling point 74–135° C. at 0.5 millimeter of mercury pressure. A major portion of the product was 1-hydroxycyclohexanecarboxylic acid, boiling point 90–100° C. at 0.5 millimeter of mercury pressure, melting point 106–107° C., acid equivalent: found 144, calculated 144.

*Example 15*

In this experiment, ethyl cyclohexanecarboxylate was hydroxylated. The starting material had the following properties: boiling point 79–83° C. at 16 millimeters of mercury pressure; refractive index $n$ 30/D of 1.4412; saponification equivalent, found 156.9, calculated 156.2.

To 1460 grams (9.46 moles) of ethyl cyclohexanecarboxylate there was added, with stirring and irradiation by ultraviolet light at 25–30° C., 1226 grams of an ethyl acetate solution of peracetic acid (304 grams, 4.0 moles of acid). The addition took 5 hours and the solution was allowed to react under irradiation for an additional 43 hours at 50° C. The reaction mixture was then distilled to give 940 grams of unreacted starting material and 442 grams of crude ethyl hydroxycyclohexanecarboxylate, boiling point 85–120° C. at 16–3 millimeters of mercury pressure. The crude product was carefully fractionated to give 170 grams of pure ethyl 1-hydroxycyclohexanecarboxylate, boiling point 101–103° C. at 15 millimeters of mercury pressure, $n$ 30/D=1.4550, saponification equivalent: found 173.5, calculated 172.2. A portion of this ester was saponified and acidified to give 1-hydroxycyclohexanecarboxylic acid, acid equivalent: found 146, calculated 144; melting point and mixed melting point with authentic 1-hydroxycyclohexanecarboxylic acid 108–109° C.

*Example 16*

In this experiment, 2-ethylhexyl acetate was hydroxylated. The starting material had a boiling point of 78° C. at 10 millimeters of mercury pressure and a refractive index $n$ 20.2/D of 1.4212.

A solution of peracetic acid (162 grams, 0.6 mole) in ethyl acetate was added to 2-ethylhexyl acetate (516 grams, 3.0 moles) after which the reaction mixture was irradiated with ultraviolet light for 18 hours at a temperature of 22–60° C. The product mixture was fractioned to give 419 grams of unreacted starting material and 69 grams of crude hydroxylated 2-ethylhexyl acetate, boiling point 80° C./10 mm. to 90° C./0.2 mm. Refractionation of the crude product gave 8 fractions, two of which were analyzed as follows: #4, boiling point 80° C. at 0.2 millimeter of mercury pressure, refractive index $n$ 20.2/D=1.4380, 63.35 percent C and 10.82 percent H; #7, boiling point 87–92° C. at 0.3 millimeter of mercury pressure, refractive index $n$ 20.2/D=1.4405, 64.38 percent C and 10.89 percent H. Analysis calculated is 63.79 percent C and 10.71 percent H. Infrared spectra was consistent with hydroxy-2-ethylhexyl acetate.

*Example 17*

In this experiment, di(n-hexyl) ether was hydroxylated. The starting material had a boiling point of 98° C. at 10 millimeters of mercury pressure and a refractive index $n$ 20.2/D=1.4208.

Di(n-hexyl) ether (919 grams, 4.94 moles) was treated with 463 grams of an ethyl acetate solution of peracetic acid (125 grams, 1.645 moles) over an addition period of 4 hours. During this period the reaction mixture was irradiated with ultraviolet light and the mixture was maintained at 20–40° C. The reagents were irradiated for an additional 11-hour period at the same temperatures.

The solution was then poured into 1000 grams of ice-water containing 86 grams of sodium hydroxide. The organic layer was separated, dried over sodium sulfate, and fractionated. Three major fractions were obtained: ethyl acetate, n-hexanol (boiling point 150–165° C.), and di(n-hexyl) ether (boiling point 128–130° C./40 mm., $n$ 20.2/D=1.4210). Redistillation of the n-hexanol fraction yielded pure n-hexanol, boiling point 156–158° C., $n$ 20.2/D=1.4182. A 3,5-dinitrobenzoate was prepared which had a melting point and a mixed melting point with the same derivative of reagent grade n-hexanol of 57.5–58° C.

The aqueous layer from the above separation was acidified, extracted with diethyl ether, and the ether layer distilled to give caproic acid, boiling point 98° C. at 10 millimeters of mercury pressure, refractive index $n$ 20.2/D=1.4171. The amide derivative of the caproic acid had a melting point of 93–98° C., compared with a literature value of 100–101° C. The yields based on peracetic acid were 67 percent to n-hexanol and 56 percent to caproic acid.

What is claimed is:

1. A process which comprises reacting an organic peracid with a saturated aliphatic compound that has at least two carbon atoms and is free of functional groups other than hydroxyl, oxy, carboxyl, carbonyloxy, amido, cyano, nitro, and halo radicals, at a temperature between −10° C. and +500° C., for a period of time sufficient to hydroxylate said saturated aliphatic compound, wherein said process is carried out under conditions which induce a free radical reaction between said organic peracid and said saturated aliphatic compound.

2. A process which comprises reacting peracetic acid with a saturated aliphatic compound that has at least two carbon atoms and is free of functional groups other than hydroxyl, oxy, carboxyl, carbonyloxy, amido, cyano, nitro, and halo radicals, at a temperature between −10° C. and +500° C., for a period of time sufficient to hydroxylate said saturated aliphatic compound, wherein said process is carried out under conditions which induce a free radical reaction between said peracetic acid and said saturated aliphatic compound.

3. A process which comprises reacting an organic peracid with a saturated aliphatic compound that has at least two carbon atoms and is free of functional groups other than hydroxyl, oxy, carboxyl, carbonyloxy, amido, cyano, nitro, and halo radicals, at a temperature between about −10° C. and +100° C., for a period of time sufficient to hydroxylate said saturated aliphatic compound, wherein said process is carried out under irradiation with ultraviolet light.

4. A process which comprises reacting peracetic acid with a saturated aliphatic compound that has at least two carbon atoms and is free of functional groups other than hydroxyl, oxy, carboxyl, carbonyloxy, amido, cyano, nitro, and halo radicals, at a temperature between about −10°

C. and +100° C., for a period of time sufficient to hydroxylate said saturated aliphatic compound, wherein said process is carried out under irradiation with ultraviolet light.

5. A process which comprises reacting peracetic acid with a saturated aliphatic hydrocarbon having at least two carbon atoms, at a temperature between about −10° C. and +100° C. for a period of time sufficient to hydroxylate said saturated aliphatic hydrocarbon, wherein said process is carried out under irradiation with ultraviolet light.

6. A process which comprises reacting peracetic acid with a saturated aliphatic alcohol having at least two carbon atoms, at a temperature between about −10° C. and +100° C. for a period of time sufficient to hydroxylate said saturated aliphatic alcohol, wherein said process is carried out under irradiation with ultraviolet light.

7. A process which comprises reacting peracetic acid with a saturated aliphatic carboxylic acid having at least two carbon atoms, at a temperature between about −10° C. and +100° C. for a period of time sufficient to hydroxylate said saturated aliphatic carboxylic acid, wherein said process is carried out under irradiation with ultraviolet light.

8. A process which comprises reacting peracetic acid with a saturated aliphatic hydroxy acid at a temperature between about −10° C. and +100° C. for a period of time sufficient to hydroxylate said saturated aliphatic hydroxy acid, wherein said process is carried out under irradiation with ultraviolet light.

9. A process which comprises reacting peracetic acid with a saturated aliphatic lactone at a temperature between about −10° C. and +100° C. for a period of time sufficient to hydroxylate said saturated aliphatic lactone, wherein said process is carried out under irradiation with ultraviolet light.

10. A process which comprises reacting peracetic acid with a saturated aliphatic ester at a temperature between about −10° C. and +100° C. for a period of time sufficient to hydroxylate said saturated aliphatic ester, wherein said process is carried out under irradiation with ultraviolet light.

11. A process which comprises reacting peracetic acid with a saturated aliphatic ether at a temperature between about −10° C. and +100° C. for a period of time sufficient to hydroxylate said saturated aliphatic ether, wherein said process is carried out under irradiation with ultraviolet light.

12. A process which comprises reacting peracetic acid with a saturated aliphatic nitrile at a temperature between about −10° C. and +100° C. for a period of time sufficient to hydroxylate said saturated aliphatic nitrile, wherein said process is carried out under irradiation with ultraviolet light.

13. A process which comprises reacting peracetic acid with a saturated aliphatic amide at a temperature between about −10° C. and +100° C. for a period of time sufficient to hydroxylate said saturated aliphatic amide, wherein said process is carried out under irradiation with ultraviolet light.

14. A process which comprises reacting peracetic acid with a saturated aliphatic nitro compound at a temperature between about −10° C. and +100° C. for a period of time sufficient to hydroxylate said saturated aliphatic nitro compound, wherein said process is carried out under irradiation with ultraviolet light.

15. A process which comprises reacting peracetic acid with cyclohexane at a temperature between about −10° C. and +100° C. for a period of time sufficient to hydroxylate said cyclohexane, wherein said process is carried out under irradiation with ultraviolet light.

16. A process which comprises reacting peracetic acid with hexane at a temperature between about −10° C. and +100° C. for a period of time sufficient to hydroxylate said hexane, wherein said process is carried out under irradiation with ultraviolet light.

17. A process which comprises reacting peracetic acid with para-menthane at a temperature between about −10° C. and +100° C. for a period of time sufficient to hydroxylate said para-menthane, wherein said process is carried out under irradiation with ultraviolet light.

18. A process which comprises reacting peracetic acid with isooctane at a temperature between about −10° C. and +100° C. for a period of time sufficient to hydroxylate said isooctane, wherein said process is carried out under irradiation with ultraviolet light.

19. A process which comprises reacting peracetic acid with decahydronaphthalene at a temperature between about −10° C. and +100° C. for a period of time sufficient to hydroxylate said decahydronaphthalene, wherein said process is carried out under irradiation with ultraviolet light.

20. A process which comprises reacting peracetic acid with tetrahydrodicyclopentadiene at a temperature between about −10° C. and +100° C. for a period of time sufficient to hydroxylate said tetrahydrodicyclopentadiene, wherein said process is carried out under irradiation with ultraviolet light.

21. A process which comprises reacting peracetic acid with pinane at a temperature between about −10° C. and +100° C. for a period of time sufficient to hydroxylate said pinane, wherein said process is carried out under irradiation with ultraviolet light.

22. A process which comprises reacting peracetic acid with paraffin wax at a temperature between about −10° C. and +100° C. for a period of time sufficient to hydroxylate said paraffin wax, wherein said process is carried out under irradiation with ultraviolet light.

23. A process which comprises reacting peracetic acid with polyethylene at a temperature between about −10° C. and +100° C. for a period of time sufficient to hydroxylate said polyethylene, wherein said process is carried out under irradiation with ultraviolet light.

24. A process which comprises reacting peracetic acid with cyclohexanol at a temperature between about −10° C. and +100° C. for a period of time sufficient to hydroxylate said cyclohexanol, wherein said process is carried out under irradiation with ultraviolet light.

25. A process which comprises reacting peracetic acid with n-decanol at a temperature between about −10° C. and +100° C. for a period of time sufficient to hydroxylate said n-decanol, wherein said process is carried out under irradiation with ultraviolet light.

26. A process which comprises reacting peracetic acid with stearyl alcohol at a temperature between about −10° C. and +100° C. for a period of time sufficient to hydroxylate said stearyl alcohol, wherein said process is carried out under irradiation with ultraviolet light.

27. A process which comprises reacting peracetic acid with gamma-valerolactone at a temperature between about −10° C. and +100° C. for a period of time sufficient to hydroxylate said gamma-valerolactone, wherein said process is carried out under irradiation with ultraviolet light.

28. A process which comprises reacting peracetic acid with cyclohexanecarboxylic acid at a temperature between about −10° C. and +100° C. for a period of time sufficient to hydroxylate said cyclohexanecarboxylic acid, wherein said process is carried out under irradiation with ultraviolet light.

29. A process which comprises reacting peracetic acid with ethyl cyclohexanecarboxylate at a temperature between about −10° C. and +100° C. for a period of time sufficient to hydroxylate said ethyl cyclohexanecarboxylate, wherein said process is carried out under irradiation with ultraviolet light.

30. A process which comprises reacting peracetic acid with 2-ethylhexyl acetate at a temperature between about −10° C. and +100° C. for a period of time sufficient to hydroxylate said 2-ethylhexyl acetate, wherein said process is carried out under irradiation with ultraviolet light.

31. A process which comprises reacting peracetic acid with di(n-hexyl) ether at a temperature between about −10° C. and +100° C. for a period of time sufficient to hydroxylate said di(n-hexyl) ether, wherein said process is carried out under irradiation with ultraviolet light.

References Cited by the Examiner
UNITED STATES PATENTS

| | | | |
|---|---|---|---|
| 2,804,473 | 8/57 | Phillips et al. | 204—158 X |
| 3,078,316 | 2/63 | Bottoms | 260—631 |

WINSTON A. DOUGLAS, *Primary Examiner.*

JOHN R. SPECK, JOHN H. MACK, *Examiners.*